US 8,144,351 B2

(12) United States Patent
Sato (10) Patent No.: US 8,144,351 B2
(45) Date of Patent: Mar. 27, 2012

(54) PRINT SYSTEM, INFORMATION PROCESSING APPARATUS, AND INFORMATION PROCESSING METHOD, INCLUDING LOG INFORMATION

(75) Inventor: Yuichiro Sato, Yokohama (JP)

(73) Assignee: Canon Kabushiki Kaisha (JP)

( * ) Notice: Subject to any disclaimer, the term of this patent is extended or adjusted under 35 U.S.C. 154(b) by 1071 days.

(21) Appl. No.: 12/035,185

(22) Filed: Feb. 21, 2008

(65) Prior Publication Data
US 2008/0204799 A1    Aug. 28, 2008

(51) Int. Cl.
*G06F 3/12* (2006.01)
(52) U.S. Cl. ........ 358/1.15; 358/1.1; 358/1.16; 370/352; 370/389
(58) Field of Classification Search .................. None
See application file for complete search history.

(56) References Cited

U.S. PATENT DOCUMENTS

| 2003/0174360 A1* | 9/2003 | Ohshima | 358/1.15 |
| 2005/0111045 A1 | 5/2005 | Imai | |
| 2005/0219596 A1* | 10/2005 | Horiyama | 358/1.13 |

FOREIGN PATENT DOCUMENTS

| JP | 2002-149371 A | 5/2002 |
| JP | 2003-330677 A | 11/2003 |
| JP | 2004-118243 A | 4/2004 |
| JP | 2005-157568 A | 6/2005 |

* cited by examiner

Primary Examiner — Benny Q Tieu
Assistant Examiner — Paul F Payer
(74) Attorney, Agent, or Firm — Rossi, Kimms & McDowell LLP (57) ABSTRACT

It is the object of the present invention to realize a print system capable of storing content of print processing as log information using a simple method. To realize this object, a user-client terminal 101 of the present invention is communicably connected to a printer 102 and a tracking information recording printer 103, and includes a first log information generating unit 306 for generating log information based on a print job generated by a printer 102-use driver 303, and a print job transmitting unit 307. The print job transmitting unit 307 transmits the print job generated by the printer 102-use driver 303 to the printer 102, appends the log information and identification information to the print job, and transmits the appended print job to the tracking information recording printer 103.

11 Claims, 5 Drawing Sheets

PRINT SYSTEM, INFORMATION PROCESSING APPARATUS, AND INFORMATION PROCESSING METHOD, INCLUDING LOG INFORMATION

BACKGROUND OF THE INVENTION

1. Field of the Invention

The present invention relates to an information processing technology in a print system capable of storing print data, which is included in a print job to be processed by a printing apparatus, together with log information.

2. Description of the Related Art

In recent years, there have been a great number of incidents in which confidential business information such as customer information has been leaked. A single incident in which confidential information is leaked can result not only in a general loss of societal trust in the business concerned, but also in businesses being forced to make enormous payouts in compensation and the like. Businesses are therefore looking for more appropriate ways to manage confidential information.

One example of a method for managing confidential information is a conventional method by which access rights are set on data including confidential information (confidential information data) or on the storage server storing this data, and access is limited to people who have the access rights.

However, the leakage incidents of recent years include an overwhelming number in which the leaks were committed by insiders who were in possession of the access rights. Consequently, the setting of access rights alone can no longer be said to offer sufficient control and must therefore be combined with some method of preventing the exposure of accessed confidential information to external parties.

In one such method, in order to avoid circumstances in which accessed confidential data is printed out and carried away as printed matter, a print system which stores print data together with log information so as to allow tracking of the confidential information is under development.

As an example of such a print system, Japanese Patent Laid-Open No. 2004-118243 discloses a method by which a spooler on a print server passes print-use intermediate data to a printer and to a print log database.

In this method, print data is stored together with log information every time print processing is performed, thereby preventing a person with access rights from secretly printing out data and effectively offering a deterrent to criminal behavior.

However, the method disclosed in Japanese Patent Laid-Open No. 2004-118243 presupposes a print system in which all intermediate data is transmitted to the printer via a printer server. Hence, the method is not sufficiently effective in print systems capable of outputting directly to a printer without going via a print server.

In such arrangements, each printer could conceivably be provided with a function (hereinafter called a log function) for storing print data together with log data. Having the printer or printer driver store the print data included in a print job to be processed via the printer in a database together with log information enables effects similar to those of disclosed patent to be obtained even when the printing is performed without going via a print server.

However, in such a case, it is necessary to provide all the printers or print drivers making up the print system with a logging function. This is because if just one printer without the logging function is connected among the plurality of printers making up the print system and the same printer is used to print confidential information, no log information or the like corresponding to the printed confidential information will be stored.

However, it is troublesome to perform modifications to add the logging function to all printers or printer drivers in a print system having mix of printers including some without the logging function. Performing such modifications is particularly troublesome when printers with undisclosed processing content from different companies are included in the print system.

Thus, to allow confidential information to be managed in such print systems, a trouble-free method of adding a logging function so that all the print data can be stored together with log information is greatly desired.

SUMMARY OF THE INVENTION

The present invention was conceived with a view to solving the above described problems and provides a print system in which it is possible to store all print data that is to be printed together with log information using a simple method.

In order to solve the above-described problems, the print system of the present invention has the following construction.

Specifically, the present invention is a print system having an information processing apparatus for transmitting a print job generated using a first or second print apparatus-use driver to a corresponding first or second print apparatus, wherein the information processing apparatus includes: a first generating unit configured to generate log information relating to a print job generated by the first print apparatus-use driver; a first transmitting unit configured to transmit the print job generated by the first print apparatus-use driver to the first print apparatus, append the log information and predetermined identification information to the print job, and transmit the appended print job to the second print apparatus, the first print apparatus includes: a first print unit configured to perform printing based on the print job received from the first transmitting unit, and the second print apparatus includes: a storage unit configured to perform to store the log information appended to the received print job in correspondence with an image generated based on the received print job; and a second print unit configured to print the received print job when the received print job is not appended with the identification information and not to print the received print job when the received print job is appended with the identification information.

According to the present invention, it is possible to realize a print system capable of storing all the print data, which is destined for printing, together with log information using a simple method.

Further features of the present invention will become apparent from the following description of exemplary embodiments (with reference to the attached drawings).

BRIEF DESCRIPTION OF THE DRAWINGS

The accompany drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

Firstly, the concept of the present invention is described. The present invention presupposes a print system including a mix of elements (printers or printer drivers (i.e. print apparatus drivers)), some with and some without the logging function. Hereinafter, the elements having the logging function are referred to as "supporting elements" and the elements not having the logging function are referred to as "non-supporting elements".

In the system described below, when a print instruction is issued by an application to the supporting element printer driver, the supporting element printer driver generates a print job, and transmits the print job to a supporting element printer via a port monitor. The supporting element printer is then controlled to perform printing based on the print job, to generate log information based on the print job, and to store the print data together with the log information.

On the other hand, when a print instruction is issued via an application to the non-supporting element printer driver, the non-supporting element printer driver generates a print job and transmits the print job to a non-supporting element printer via a port monitor. At this point the port monitor of the print system generates log information based on the print job, adds the generated log information and predetermined identification information to the print job, and then transmits the resulting print job to a supporting element printer.

As a result, when a print instruction specifying a non-supporting element printer has been issued, print output is performed based on the print job in the conventional manner in the non-supporting element printer except in that the supporting element printer stores the print data and log information corresponding to the print output. In other words, even when printing using a non-supporting element printer, a supporting element printer is used in combination to store log information and the printer data.

Note that, at this point, the supporting element printer does not perform printing based on the received print job. In summary, when the supporting element printer receives a print job, the above described identification information is used to judge whether to perform printing (print propriety judgment).

Thus, according to the present invention, even when non-supporting element printers are included in the print system, it is possible to store log information and print data without modifying the non-supporting element printer and non-supporting element printer driver. Consequently, it is possible to realize a print system capable of storing all the print data that is to be printed and the associated log information using a simple method.

The following describes the embodiments of the present invention in detail, making reference where necessary to the attached drawings. Note that in the following description "port monitor" is used to mean an intermediary program which transfers data between a print service and an actual printer. More specifically, the "port monitor" is a program including a function for transmitting data to the printer in accordance with the chosen connection method (whether that be RS232C, USB, or via a network).

First Embodiment

1. Print System Construction

Figure 1:
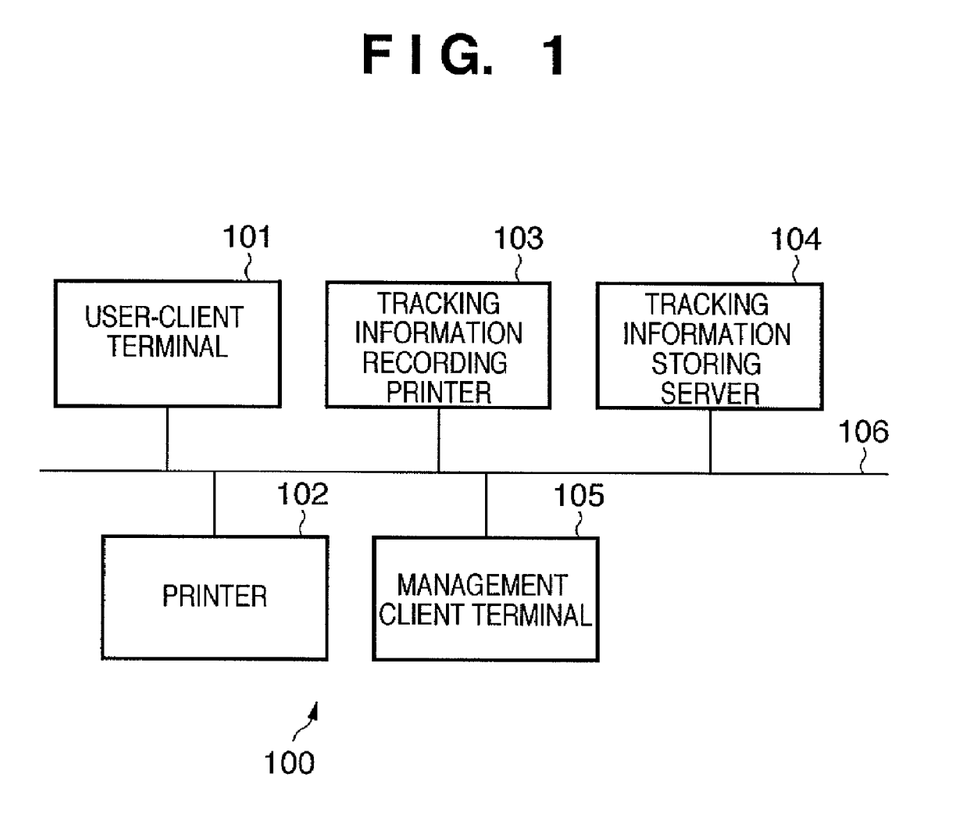
FIG. 1 is a block diagram showing an example system construction for a print system of a first embodiment of the present invention.

FIG. 1 is a block diagram showing an example system construction of a print system of a first embodiment of the present invention.

The print system 100 includes a user-client terminal (information processing apparatus) 101, a printer (first printing apparatus) 102, a tracking information recording printer (second printing apparatus) 103, a tracking information storing server 104, and a management client terminal 105. The units are all communicably connected via a network 106.

The user-client terminal 101 includes functions for receiving a print request from a user and for extracting/generating log information which matches the print request. The user-client terminal 101 also includes a function for generating a print log recording-use job flag (identification information). The user-client terminal 101 further includes a function for appending the print log recording-use job flag (identification information) to a generated print job and log information, and transmitting the appended print job to the tracking information recording printer 103. The user-client terminal 101 further includes a function for transmitting a print job to the printer 102 in accordance with content of the print request.

The printer 102 (non-supporting element printer) includes a function for performing printing in accordance with the received print job.

As the supporting element, the tracking information recording printer 103 includes the logging function (printing function and storing function). Specifically, when a print request has been made to the tracking information recording printer 103, the tracking information recording printer 103 generates and prints a print image based on the print job and generates log information. The tracking information recording printer 103 further includes a function for generating a store image based on the print job, and transmitting the store image in correspondence with the generated log information to the tracking information storing server 104.

Besides functioning as the supporting element, the tracking information recording printer 103 includes a function for confirming that the print log recording-use job flag (identification information) has been appended to the received print job and log information. Note that the above-described print function is not operational when the print log recording-use job flag has been appended to the received print job. The print function is only operational when the print log recording-use job flag has not been appended.

The tracking information storing server 104 (storage unit) includes a function for recording the store images received from the tracking information recording printer 103 in correspondence with log information in storage regions within itself or other information devices (not shown in FIG. 1) to form a database.

The management client terminal 105 includes a function for searching and reading the log information and store images recorded in the above-described database according to requirements of a system administrator of the print system 100.

Note that the functions provided in the management client terminal 105 and the functions provided in the tracking information storing server 104 may be realized in the same information device.

2. Hardware Construction of the User-Client Terminal 101 (Information Processing Apparatus)

Figure 2:
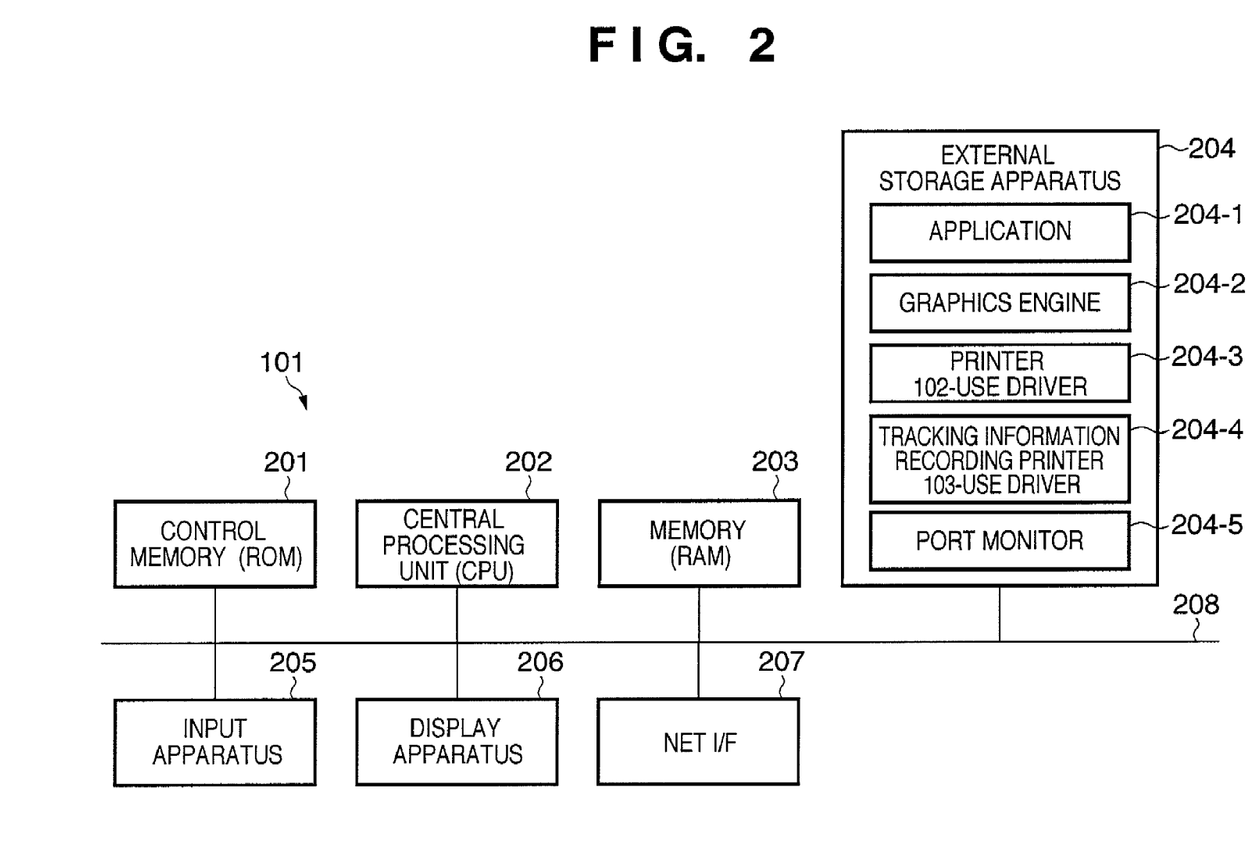
FIG. 2 is a diagram showing a hardware construction of the user-client terminal 101.

FIG. 2 is a diagram showing the hardware construction of the user-client terminal 101.

As shown in FIG. 2, reference numeral 201 denotes control memory (ROM), reference numeral 202 denotes a central processing unit, reference numeral 203 denotes memory (RAM), reference numeral 204 denotes an external storage apparatus, reference numeral 205 denotes an input apparatus, reference numeral 206 denotes a display apparatus, reference numeral 207 denotes a NET I/F apparatus, and reference numeral 208 denotes a bus.

The external storage apparatus 204 includes a control program for realizing an information processing method of the present embodiment. Specifically, the external storage apparatus 204 includes an application 204-1, a graphics engine 204-2, a printer 102-use driver 204-3, a tracking information recording printer 103-use driver 204-4, a port monitor 204-5, and the like.

This control program and data are received into suitable areas of the memory 203 via the bus 208 under the control of the central processing unit 202. The control program is then executed by the central processing unit 202.

3. Flow of Print Processing in the Print System 100

Figure 3:
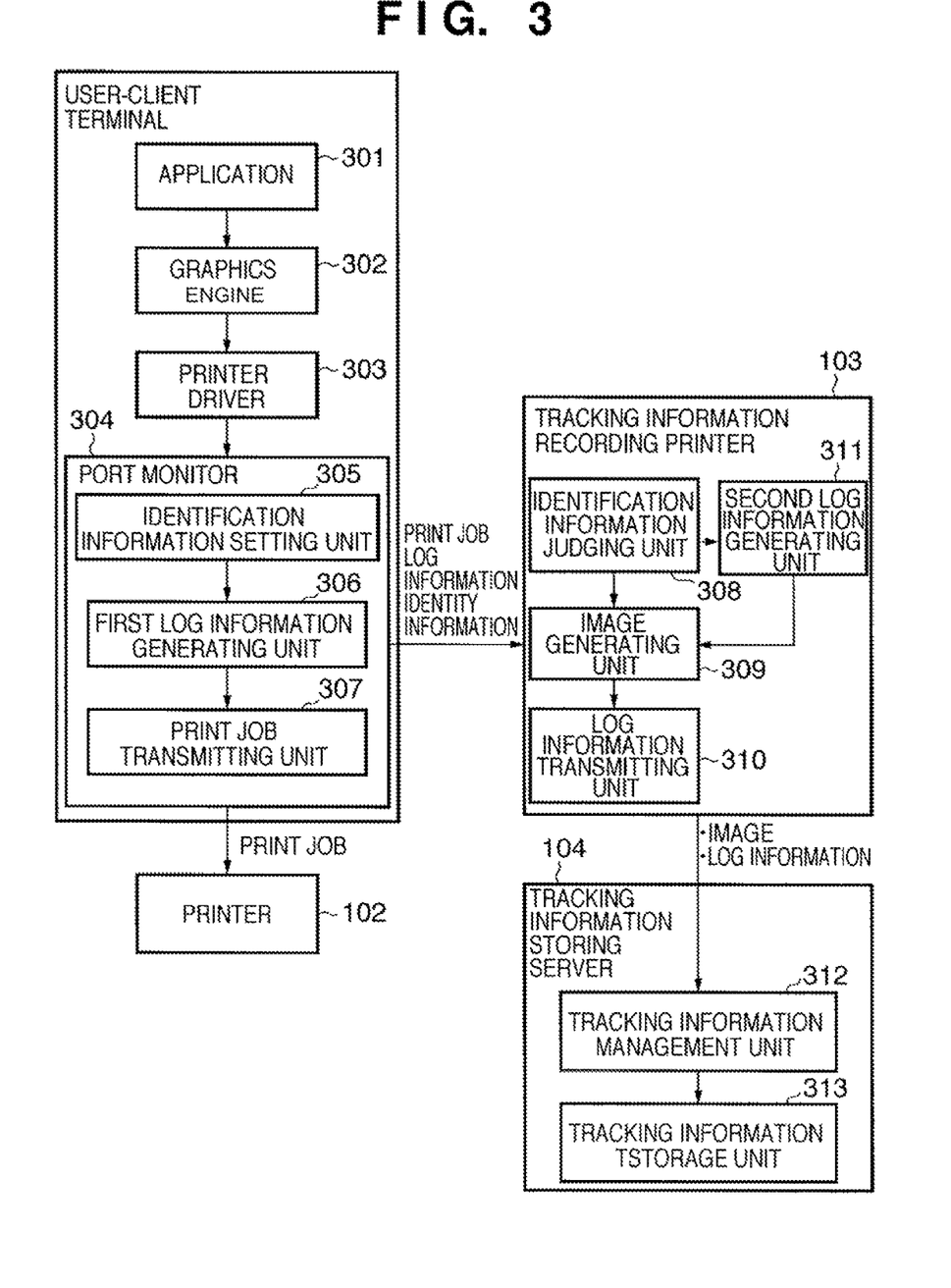
FIG. 3 is a functional block diagram for explaining a flow of print processing when a print request has been made in the user-client terminal 101 via an application.

FIG. 3 is a functional block diagram for explaining the flow of print processing when the print request has been made in the user-client terminal 101 via an application. Note that the following only describes the print processing for the case in which the print request has been made to the printer 102. Since the print processing in the case that the print request is made to the tracking information recording printer 103 resembles the conventional print processing, a description thereof has been omitted.

As shown in FIG. 3, the port monitor 304 of the print system 100 of the present embodiment includes an identification information setting unit 305, a first log information generating unit 306, and a print job transmitting unit 307 (each performing a single function in the port monitor).

Note that the identification information setting unit 305, the first log information generating unit 306, and the print job transmitting unit 307 may each be a built-in module of the port monitor 304, or be of a library module format of a separately installed library.

Further, the tracking information recording printer 103 of the print system 100 of the present embodiment includes an identification information judging unit 308, an image generating unit 309, and a log information transmitting unit 310.

Note that, in the same way as the above-described units, the identification information judging unit 308, the image generating unit 309, and the log information transmitting unit 310 may each be a built-in module of the tracking information recording printer 103, or be of a library module format of a separately installed library.

As shown in FIG. 3, when a print request is issued to the printer 102 from the application 301 as a result of a print request from a user, the graphics engine 302 first calls up the printer 102-use driver 303 prepared for each printer. The graphics engine 302 then sets the printer 102-use driver 303 as an output of the application 301.

The application 301 then transmits application data to the printer 102-use driver 303 based on the print request made by the user.

The printer 102-use driver 303 calls the port monitor 304, records the received application data in the printer 102 in a specific format (PDL), and generates the print job by converting the application data to print data. The print job transmitting unit 307 transmits the print job generated by the printer 102-use driver 303 to the printer 102.

The printer 102 generates a print image from the print data (PDL format) included in the received print job, and discharges printed matter.

Moreover, the identification information setting unit 305 in the port monitor 304 appends the tracking information recording-use job flag (identification information) to the print job received from the printer 102-use driver 303.

Note that when the identification information setting unit 305 appends the identification information, the identification information may be appended in a specially provided region in the print job or be appended to a name of the print job. Alternatively, the identification information may be appended in combination with the user name or other attributes of the print job.

The first log information generating unit 306 extracts log information relating to the print job. Here the log information includes a user name capable of uniquely specifying the user, a client terminal name which uniquely specifies the client terminal, a print time and date, a file name of the file to be printed, a number of pages to be printed, number of copies, and the like. Note, however, that there are no particular limits on the information included in the log information, and any information which can subsequently be used as a key by the system administrator of the print system 100 in searching and reading operations may be used.

The print job transmitting unit 307 transmits the log information extracted by the first log information generating unit 306 to the tracking information recording printer 103 together with the print job received by the printer 102-use driver 303 and the identification information appended to the print job.

The identification information judging unit 308 of the tracking information recording printer 103 checks whether the tracking information recording-use job flag (identification information) has been appended to the print job received from the print job transmitting unit 307.

When the identification information judging unit 308 judges that the tracking information recording-use job flag has been appended, the image generating unit 309 performs RIP processing on the print data (PDL format) included in the received print job.

The RIP processing coverts the print data (PDL format) to a predetermined format, such as the PDF format from Adobe, which can subsequently be searched, read, and reprinted by the system administrator of the print system 100, thereby generating the store image.

The log information transmitting unit 310 transmits the store image generated by the image generating unit 309 and the received log information to a tracking information management unit 312 included in the tracking information storing server 104.

Note that, here, since the identification information judging unit 308 has judged that the tracking information recording-use job flag (identification information) has been appended to the print job, the tracking information recording printer 103 does not discharge printed matter. The tracking information recording printer 103 only discharges printed matter when the tracking information recording-use job flag (identification information) is not appended to the received print job. In other words, the application 301 only prints out in the case that a print request specifying the tracking information recording printer 103 is made.

Note that in this case, the print processing is judged to be normal, and the image generating unit 309 performs RIP processing on the print data (PDL format) included in the received print job to generate the print image and the store image (of which, the print image is printed out). The second log information generating unit 311 extracts/generates log information relating to the print job. The log information transmitting unit 310 then transmits the store image generated by the image generating unit 309 and the log information generated by the second log information generating unit 311 to a tracking information management unit 312 included in the tracking information storing server 104.

The tracking information management unit 312 of the tracking information storing server 104 receives the log information and the store image from the tracking information recording printer 103, and transfers the received log information and store image to a tracking information storage unit 313. The tracking information storage unit 313 then stores the received log information and storage image.

Note that the tracking information management unit 312 may, where necessary, have functions for processing or classifying the received log information.

Note also that even if upon receipt the log information is immediately transmitted to the tracking information storage unit 313, the tracking information management unit 312 may temporarily store the log information in a storage region such as hard disk.

Moreover, the log information may be transmitted to the tracking information storage unit 313 in accordance with a separately specified transmission schedule.

4. Details of Processing in the Port Monitor 304

Figure 4:
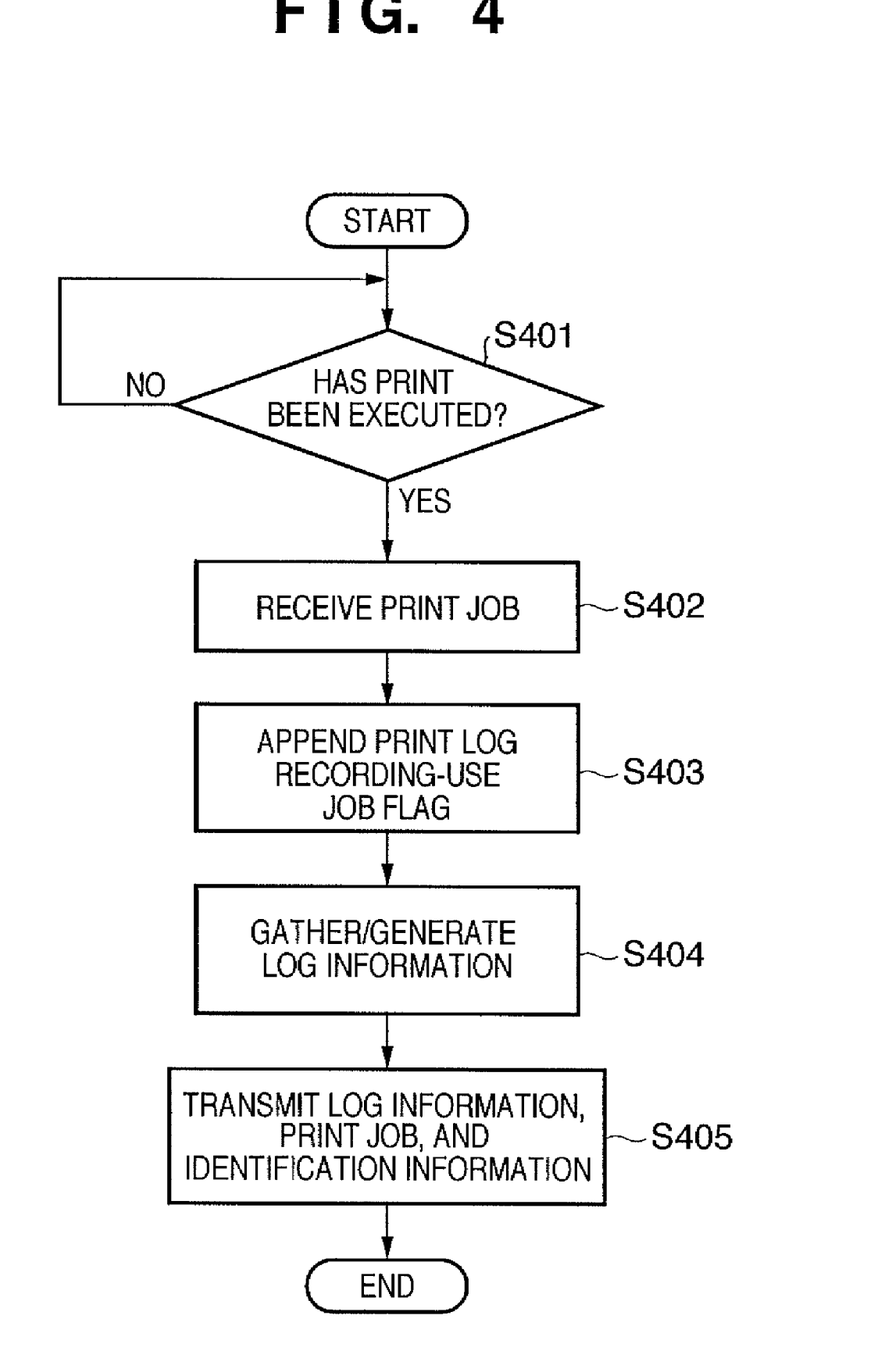
FIG. 4 is a flowchart showing a flow of print processing in a port monitor 304 of an information processing apparatus (user-client terminal 101)

FIG. 4 is a flowchart showing a flow of print processing in the port monitor 304 of the information processing apparatus (user-client terminal 101) of the present embodiment.

After the print processing has started (step S401), the port monitor 304 receives, in step S402, the print job transmitted from the printer 102-use driver 303.

Then, in step S403, the identification information setting unit 305 assigns a tracking information recording-use job flag (identification information) to the received print job.

In step S404, the first log information generating unit 306 gathers/generates log information corresponding to the received print job.

Specific examples of possible log information include attribute information relating to the print job, information about the printing environment, and attribute information relating to pages.

In step S405, the print job transmitting unit 307 transmits the extracted/generated log information to the tracking information recording printer 103 together with the print job and the identification information received from the printer 102-use driver 303. The print job transmitting unit 307 also transmits the print job received from the printer 102-use driver to the printer 102.

5. Details of Processing in the Tracking Information Recording Printer

Figure 5:
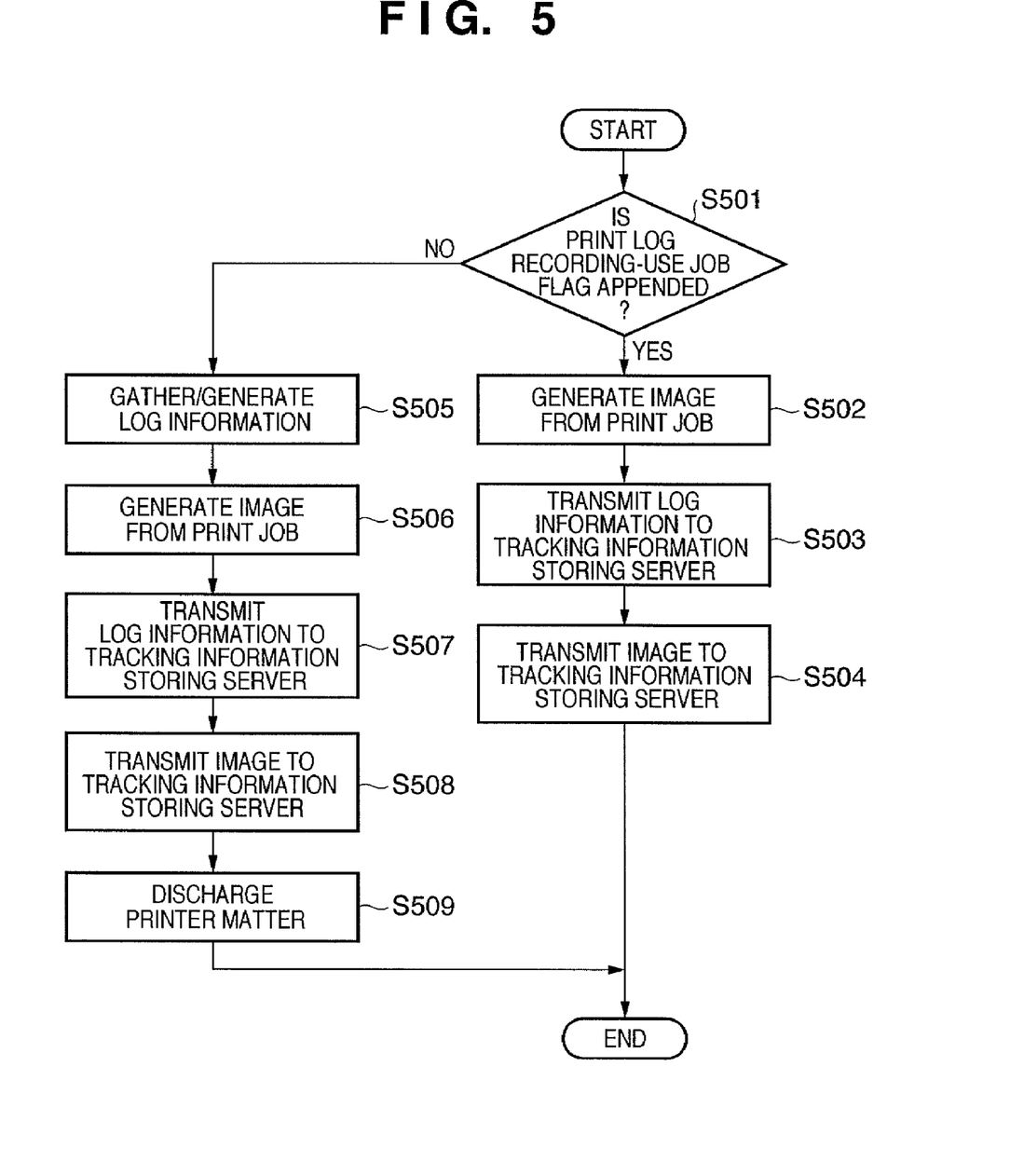
FIG. 5 is a flowchart showing a flow of processing during print processing in a tracking information recording printer 103 in the print system.

FIG. 5 is a flowchart showing a flow of processing during print processing in a tracking information recording printer 103 of the print system 100 of the present embodiment.

In step S501, the identification information judging unit 308 checks whether identification information has been appended to the print job received from the print job transmitting unit 307.

When it is confirmed that identification information has been appended to the received print job, in step S502, the image generating unit 309 judges a PDL type of the print data included in the received print job, and selects a processing thread capable of interpreting PDL type data. The image generating unit 309 then uses the selected processing thread to generate a store image for the print data included in the received print job.

In step S503, the log information transmitting unit 310 transmits the log information received from the print job transmitting unit 307 to the tracking information management unit 312.

In step S504, the log information transmitting unit 310 transmits the store image generated in step S502 to the tracking information management unit 312.

Note that in step S501, when it is confirmed that the tracking information recording-use job flag (identification information) has been appended, printed matter has been discharged by the printer 102, and so the tracking information recording printer 103 does not discharge printed matter.

On the other hand, when in step S501 it is confirmed that the tracking information recording-use job flag (identification information) has not been appended to the received print job, the processing proceeds to steps S505.

In step S505, the second log information generating unit 311 gathers/generates log information corresponding to the received print job. Specific examples of the log information that is gathered include attribute information relating to the print job, information about the printing environment, and attribute information relating to pages.

In step S506, the image generating unit 309 judges the PDL type of the print data included in the received print job, and selects a processing thread capable of interpreting print data of the detected PDL type. The image generating unit 309 then uses the selected processing thread to generate the print image and the store image for the print data included in the received print job. In other words, the tracking information recording printer 103 is capable of interpreting both the print job generated by the printer 102-use print driver and the print job generated by the tracking information recording printer 103-use printer driver.

In step S507, the log information transmitting unit 310 transmits the log information generated in step S505 to the tracking information management unit 312.

In step S508, the log information transmitting unit 310 transmits the store image generated in step S506 to the tracking information management unit 312.

In step S509, the tracking information recording printer 103 prints the print image generated in step S506 to form printed matter and discharges the printed matter.

As is clear from the above description, in the present embodiment, the print data and log information are stored even when a non-supporting element printer (printer 102) is included in the print system 100. This is achieved by making use of the supporting element printer (tracking information recording printer 103). In other words, it is possible to reliably store the print data and the log information even when non-supporting element printers (like printer 102) are included in the print system.

Moreover, this effect is realized in the present embodiment by making modifications to the port monitor and the supporting element printer (tracking information recording printer 103) alone. Since neither the non-supporting element printer (printer 102) nor the printer 102-use driver is modified, the above-described arrangement can be realized with comparative ease.

Note that although the above description does not make any particular reference to a format for the print job generated by the printer 102-use driver 303, a format such as the PCL (Registered Trademark) from HP or the XPS format used by Windows Vista (Registered Trademark) may be used. Note, however, that there is no particular limit on the type or format of the print job.

The above description gave the PDF format from Adobe as an example format for the store image generated by the image generating unit 309 from the received print job. However, the present invention is not limited to such a format, and any type/format which allows the system administrator of the print system to subsequently search, read and reprint the store image may be used. Such formats include the JPEG format, the bitmap format, and the like.

Other Embodiments

It is to be noted that the present invention can be applied both to a system made up of plurality of devices (such as a host computer, an interfacing device, a reader, and a printer) and to an apparatus (such as a copier or a facsimile apparatus) that is a single device.

The object of the present invention can naturally be achieved by supplying to a system or an apparatus a storage medium having recorded thereon a software program code for realizing the above described functions. In this case, a computer (or CPU or MPU) of the system or the apparatus reads and executes the program code stored on the storage medium, thereby realizing the above-described functions. Note that in this case the storage medium on which the program code is stored constitutes the present invention.

The storage medium for supplying the program code may be a Floppy (Registered Trademark), a hard disk, an optical disk, an optomagnetic disk, a CD-ROM, a CD-R, a magnetic tape, a non-volatile memory card, ROM or the like.

Note also that present invention is not limited to the case in which the functions of the above described embodiment are realized by a computer reading and executing program code. For instance, the present invention naturally includes the case in which an OS (operating system) or the like running on the computer performs a part or all of the actual processing based on instructions in the program code, and thereby realizes the functions of the above-described embodiment.

Moreover, the present invention includes the case in which the functions of the above-described embodiment are realized after the program code has been read from the storage medium and written to memory included in a function expansion board inserted into the computer or a function expansion unit connected to the computer. In other words, the present invention includes the case in which, after the program code has been written to the memory, the CPU or the like included on the function expansion board or function expansion unit performs a part or all of the actual processing based on instructions in the program code, and thereby realizes the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-042679, filed Feb. 22, 2007, which is hereby incorporated by reference herein in its entirety.

What is claimed is:

1. A print system comprising an information processing apparatus for transmitting a print job generated by a first or second print driver to a corresponding first or second print apparatus, wherein
said information processing apparatus includes:
a first generating unit configured to generate log information relating to a print job generated by said first print driver; and
a first transmitting unit configured to transmit the print job generated by said first print driver to said first print apparatus, append the log information and predetermined identification information to the print job, and transmit the appended print job to said second print apparatus,
said first print apparatus includes:
a first print unit configured to perform printing based on the print job received from said first transmitting unit, and
said second print apparatus includes:
a storage unit configured to store the log information appended to the received print job in correspondence with an image generated based on the received print job; and
a second print unit configured to print the received print job when the received print job is not appended with the identification information and not to print the received print job when the received print job is appended with the identification information.

2. The print system of claim 1, wherein the print job generated by said first print driver and the print job generated by said second print driver are both interpretable by said second print apparatus.

3. The print system of claim 2, wherein said second print apparatus further includes a converting unit configured to generate an image by converting the interpreted print job to data of a predetermined format, and said storage unit performs control to store the image generated by said converting unit as the image generated based on the print job.

4. The print system of claim 1, wherein said information processing apparatus further includes a second transmitting unit configured to transmit the print job generated using said second print driver to said second print apparatus.

5. The print system of claim 4, wherein said second print apparatus further includes a second generating unit configured to, when the identification information has not been appended to the received print job, generate log information relating to the received print job, and when the identification information has not been appended to the received print job, said storage unit performs control to store the log information generated by said second generating unit in correspondence with the image generated based on the received print job.

6. The print system of claim 1, wherein said information processing apparatus includes a port monitor, and said first generating unit and said first transmitting unit are realized as single functions of the port monitor.

7. An information processing apparatus communicably connected to a first print apparatus having a print function for performing printing based on a received print job and a second print apparatus having a print function for performing printing based on a received print job, the information processing apparatus comprising:
a generating unit configured to generate log information related to a print job generated by a first print driver; and a first transmitting unit configured to transmit the print job generated by said first print driver to said first print apparatus, to append to the print job the log information and identification information indicating print propriety for said second print apparatus, and to transmit the print job and the appended information to said second print apparatus, whereas said second print apparatus includes a storage unit configured to perform control to store the log information appended to a received print job in correspondence with an image generated based on the received print job and a second print unit configured to print the received print when the received print job is not appended with the identification information and not to print the received print job when the received print job is appended with the identification information.

8. The information processing apparatus of claim 7, further comprising a second transmitting unit configured to transmit a print job generated by a second print driver to said second print apparatus.

9. The information processing apparatus of claim 7 further comprising a port monitor, wherein said generating unit and said first transmitting unit are realized as single functions of the port monitor.

10. An information processing method in an information processing apparatus communicably connected to a first print apparatus having a print function for performing printing based on a received print job and a second print apparatus having a print function for performing printing based on a received print job, the information processing method comprising steps of:

generating log information related to a print job generated by a first print driver; and transmitting the print job generated by said first print driver to said first print apparatus;

appending to the print job the log information and identification information indicating print propriety for said second print apparatus;

transmitting the print job with the appended log information to said second print apparatus;

said second print apparatus storing the log information related to a received print job in correspondence with an image generated based on the received print job; and said second print apparatus printing the received print job when the received print job is not appended with the identification information and not printing the received print job when the received print job is appended with the identification information.

11. A non-transitory computer-readable storage medium having stored thereon a control program for causing a computer to execute an information processing method in an information processing apparatus communicably connected to a first print apparatus having a print function for performing printing based on a received print job and a second print apparatus having a print function for performing printing based on a received print, wherein the information processing method includes steps of:

generating log information related to a print job generated by a first print driver; and transmitting the print job generated by said first print driver to said first print apparatus;

appending to the print job the log information and identification information indicating print propriety for said second print apparatus;

transmitting the print job with the appended log information to said second print apparatus;

said second print apparatus storing the log information related to a received print job in correspondence with an image generated based on the received print job; and said second print apparatus printing the received print job when the received print job is not appended with the identification information and not printing the received print job when the received print job is appended with the identification information.

* * * * *